United States Patent

Kirkwood et al.

[11] Patent Number: 5,954,608
[45] Date of Patent: Sep. 21, 1999

[54] DRIVE SPEED CONTROL SYSTEM UTILIZING INFLATABLE BLADDERS

[75] Inventors: Malcolm E. Kirkwood, Livonia; Graham M. Annear, Farmington Hills, both of Mich.

[73] Assignee: Borg-Warner Automotive, Inc., Sterling Heights, Mich.

[21] Appl. No.: 09/075,752

[22] Filed: May 11, 1998

[51] Int. Cl.$^6$ ...................................................... F16H 5/66
[52] U.S. Cl. ........................... 475/147; 475/317; 475/116
[58] Field of Search .................. 475/116, 187, 475/317, 323, 346, 347, 147

[56] References Cited

U.S. PATENT DOCUMENTS

| | | |
|---|---|---|
| 2,361,357 | 10/1944 | Schmitter . |
| 2,371,828 | 3/1945 | Kuhns . |
| 2,460,629 | 2/1949 | Fawick ..................... 475/347 |
| 2,486,269 | 10/1949 | Fawick . |
| 2,511,548 | 6/1950 | Shibles . |
| 2,574,431 | 11/1951 | Banker . |
| 3,448,828 | 6/1969 | Goldberg . |
| 3,975,989 | 8/1976 | Hirmann . |
| 4,721,016 | 1/1988 | Burandt ................. 475/346 X |
| 4,774,857 | 10/1988 | Heine et al. ............... 475/142 |
| 5,429,558 | 7/1995 | Lagarde ................. 475/346 X |

FOREIGN PATENT DOCUMENTS 6917 3/1900 United Kingdom .

Primary Examiner—Dirk Wright
Assistant Examiner—Peter T. Kwon
Attorney, Agent, or Firm—Lyon & Artz PLC; Greg Dziegielewski

[57] ABSTRACT

A drive speed control system having an input shaft and an output shaft in communication with a planetary gear mechanism. The planetary gear mechanism is in communication with a first rotatable drum member and a second rotatable drum member which is positioned radially inward relative to the first rotatable drum member. A first annular inflatable member is positioned radially outwardly of the first rotatable drum member and a second annular inflatable member is positioned radially between the first and second rotatable drum members. The first and second annular inflatable members are in communication with a control system to cause the inflation of the first annular inflatable member to inhibit rotation of the first rotatable drum member and to cause inflation of the second annular inflatable member, when the first annular inflatable member is uninflated, to cause the first rotatable drum member to rotate in unison with the second rotatable drum.

14 Claims, 5 Drawing Sheets

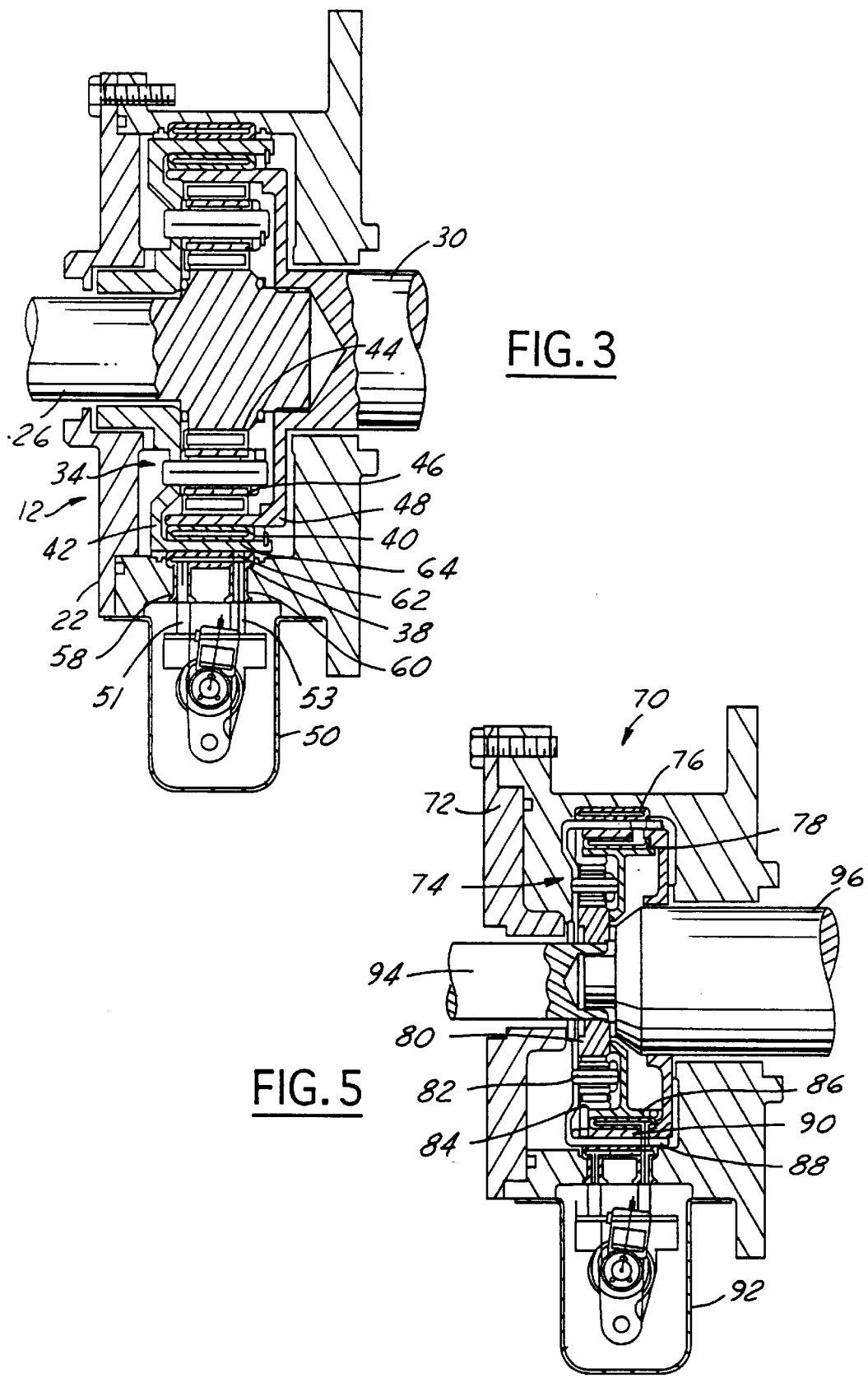

ATC ALTERNATIVE CONCEPT AUTOMATIC TRANSMISSION
8 SPEED MODE CHART

| GEAR | RATIO | RATIO SPACING | B1 | B1A | B2 | B2A | B3 | B3A | B4 | B4A | B5 | B5A |
|---|---|---|---|---|---|---|---|---|---|---|---|---|
| 1 | 3.37 |  |  | x |  | x |  |  |  |  | x |  |
| 2 | 2.70 | 1.25 |  | x | x | x | x |  | x |  | x |  |
| 3 | 2.25 | 1.20 |  | x | x |  | x | x | x |  | x |  |
| 4 | 1.80 | 1.25 |  | x |  | x |  | x | x |  | x |  |
| 5 | 1.50 | 1.20 |  | x | x |  |  | x |  | x | x |  |
| 6 | 1.20 | 1.25 |  | x |  | x |  | x |  | x |  |  |
| 7 | 1.00 | 1.20 |  | x |  |  |  | x |  | x |  | x |
| 8 | 0.80 | 1.25 |  |  |  |  |  | x |  | x |  | x |
| R | 3.37 |  | x | x |  |  |  |  | x |  | x |  |

FIG.6

DRIVE SPEED CONTROL SYSTEM UTILIZING INFLATABLE BLADDERS

TECHNICAL FIELD

The present invention relates to a drive speed control system for a transmission. More specifically, the present invention relates to a drive speed control system for a vehicle transmission utilizing a plurality of inflatable bladders to effectuate speed selection through the use of gear changes.

BACKGROUND ART

Current drive speed control systems utilize planetary gear sets together with a plurality of clutch packs to accomplish speed selection. The speed selection is enabled through the use of a fluid actuatable clutch and a brake system which permits the driven shaft to be operated in direct drive at full speed or through the transmission at a reduced speed. An example of such a prior drive speed system is shown in U.S. Pat. No. 3,448,828.

Typical automatic transmissions (i.e., 5 speed transmissions) that utilize clutch packs to effectuate ratio selection suffer from parasitic drag which can negatively impact power train efficiency. Additionally, in these typical automatic transmissions, the front wheel drive and the rear wheel drive transmissions do not have any common components with one another. Thus, the assembly of each transmission requires entirely separate processes. Because these prior automatic transmissions utilize a plurality of clutch packs, they require a large amount of space. These prior transmissions are also relatively expensive and cumbersome to assemble because of the complexity of their systems.

SUMMARY OF THE INVENTION

The present invention is directed to overcoming one or more of the problems as set forth above. It is an object of the present invention to provide a drive speed control system that reduces the amount of parasitic drag present in a vehicle transmission and thus provides for improved fuel economy.

A further object of the present invention is to provide a drive speed control system that has a decreased number of components and thus decreases the cost of manufacture for the system.

Another object of the present invention is to provide a drive speed control system that has modular components allowing for flexibility during assembly, thus simplifying the assembly process of the transmission.

It is still another object of the present invention to provide a drive speed control system that provides improved packaging efficiency.

According to the present invention, the foregoing and other objects are attained by providing a drive speed control system with a planetary gear mechanism. The planetary gear mechanism is in communication with an input shaft and output shaft and also is in communication with a first rotatable drum member and a second rotatable drum member which is positioned radially inwardly relative to the first rotatable drum member. A first annular inflatable member is positioned radially outwardly of the first rotatable drum member. A second annular inflatable member is positioned radially between the first and second rotatable drum members. Each of the first and second annular inflatable members is in electrical communication with a control system. The control system is adapted to cause the first annular inflatable member to be inflated and expand radially, thereby inhibiting rotation of the first rotatable drum member. The control system also causes the first annular inflatable member to deflate, while causing the second annular inflatable member to be inflated and expand radially, thereby causing the second rotatable drum member to rotate in unison with the first rotatable drum member.

Additional objects and features of the present invention will become apparent upon review of the drawings and accompanying detailed description of the preferred embodiments.

BRIEF DESCRIPTION OF THE DRAWINGS

FIG. 3 is a sectional view of one module of the drive speed control system illustrated in FIG. 1;

FIG. 5 is a sectional view of an alternative embodiment of a module for a drive speed control system in accordance with the present invention; and FIG. 6 is a mode chart for an 8 speed automatic transmission in accordance with a preferred embodiment of the present invention.

DETAILED DESCRIPTION OF THE PREFERRED EMBODIMENTS

Figure 1:
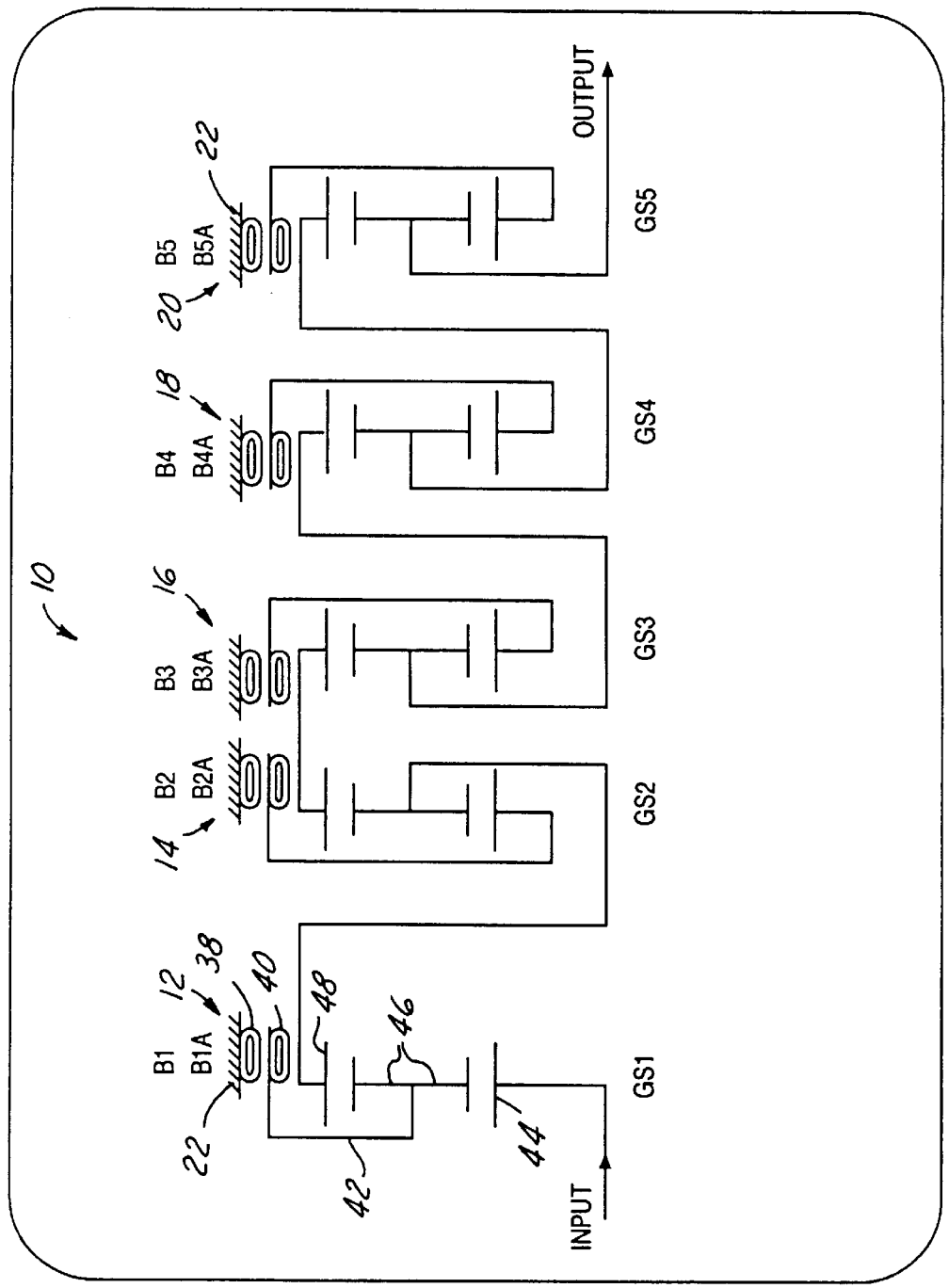
FIG. 1 is a schematic diagram of the various modules of a drive speed control system in accordance with a preferred embodiment of the present invention.

Referring now to FIG. 1, a drive speed control system 10 for a vehicle transmission is schematically illustrated. The drive speed control system 10 is contained in a transmission housing and preferably includes a plurality of separate and discrete modules. The modules provide advantages, not only in the operation of the preferred drive speed control system, but also in its assembly. The drive speed control system 10 of the present invention can be applied to either the front wheel drive or rear wheel drive transmissions of a vehicle since the same components can be used for each transmission.

Figure 2:
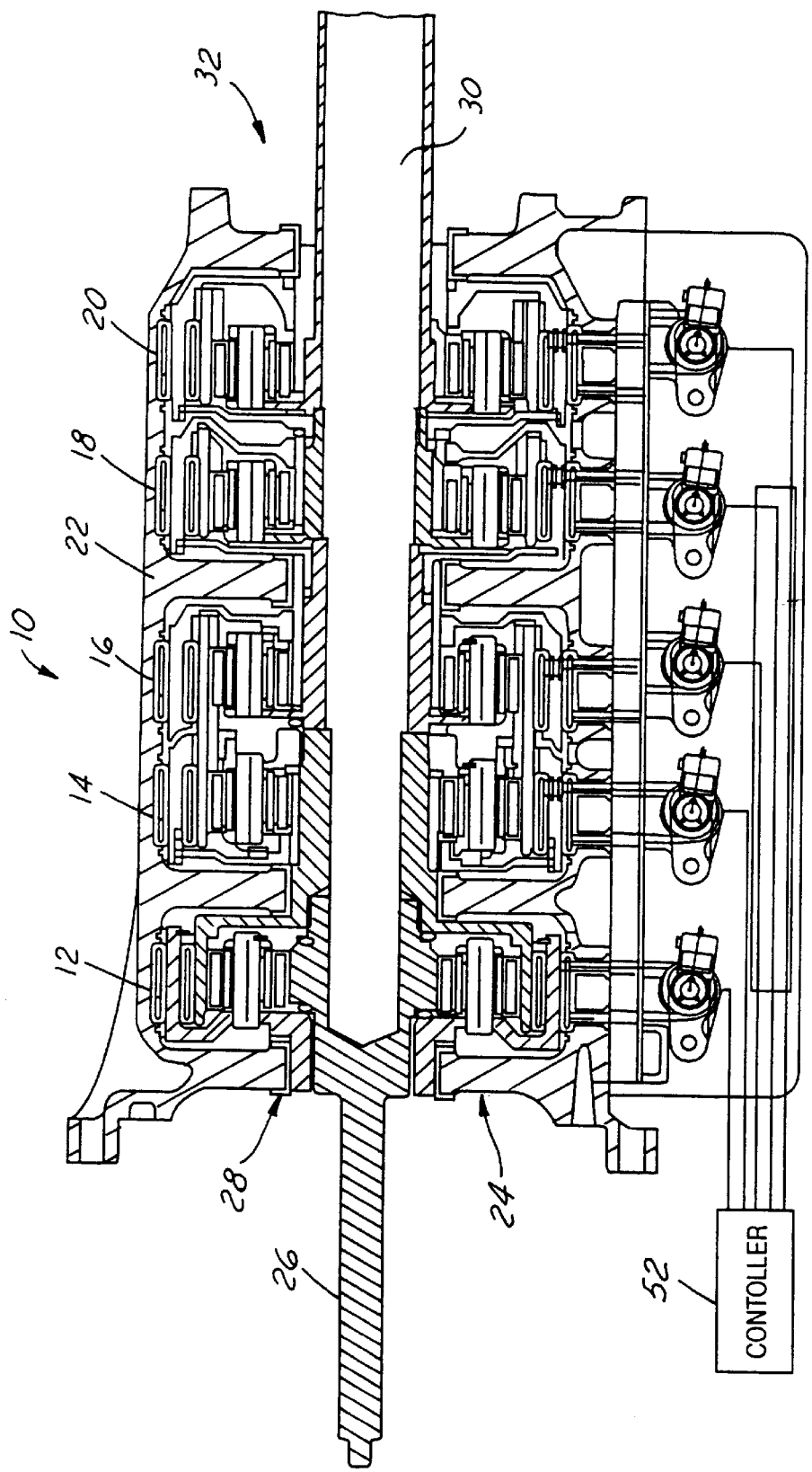
FIG. 2 is a sectional view of a drive speed control system in accordance with a preferred embodiment of the present invention.

FIGS. 1 and 2 illustrate the various modules of the preferred drive speed control system 10. The first module 12 is the forward/reverse module. The second module 14 is preferably the overdrive module. In the preferred embodiment, the third module 16, the fourth module 18, and the fifth module 20 are all ratio changing modules that allow for ratio changes as demanded by a control system. It should be understood that the operation of the respective modules can be varied as well as the function that each of the modules performs. Additionally, more or less modules may be included.

The modules 12, 14, 16, 18, and 20 are all positioned within the transmission housing 22. The transmission housing 22 is preferably divided into a first half 24 and a second half (not shown) which are mirror images of one another to allow for easy assembly. During assembly, the modules 12, 14, 16, 18, and 20 are assembled, then the first half 24 of the transmission housing 22 and the second half of the transmission housing are secured together around the modules.

The transmission housing 22 is then bolted to the vehicle. An input shaft 26 extends into an input end 28 of the transmission housing 22 and is in rotational communication with the first module 12. An output shaft 30 is in rotational communication with the first module 12 and extends from the output end 32 of the transmission housing 22.

FIG. 3 illustrates the components of the first module 12. However, the components included in each of the modules 12, 14, 16, 18, and 20, in this embodiment, are essentially the same and therefore a description of the operation of the components of one module will be sufficient for one of ordinary skill in the art to understand the operation of the other modules. It will also be understood by one of ordinary skill in the art that any differences in the operation of each of the modules is in order to effectuate the appropriate ratio changes.

As shown in FIGS. 1 and 3, the first module 12 has a planetary gear set 34, a first annular bladder 38, and a second annular bladder 40. The planetary gear set 34 includes a first rotatable drum member or carrier assembly 42, a sun gear 44, and a ring gear or second rotatable drum member 48. The sun gear 44 is in direct communication with the input shaft 26 and also in rotational communication with a plurality of planetary gears 46. The planetary gears 46 are in rotational communication with the ring gear 48 which is in direct communication with the output shaft 30. Planetary gears and their operation are well known in the art.

The first annular inflatable member or bladder 38 is positioned outwardly of the first rotatable drum member 42. As shown in FIG. 3, the first annular inflatable member 38 is preferably attached at its outer surface to the transmission housing 22, and extends annularly around the first module 12. The second rotatable drum member 48 is positioned radially inwardly relative to the first rotatable drum member 42. The second annular inflatable member 40 is positioned radially between the first rotatable drum member 42 and the second rotatable drum member 48. The second annular inflatable member 40 is preferably attached to the first rotatable drum member 42 and rotates therewith.

The module 12 has a solenoid 50, including a pair of solenoid feeds 51, 53, in fluid communication with the first annular inflatable member 38 and also the second annular inflatable member 40. The solenoid 50 is in electrical communication with an electronic control module (ECM) 52, as shown in FIG. 2. The ECM can be any commercially available ECM. The ECM is in turn in communication with a gear selector (not shown) to receive signals representative of the gear selected and then to operate the respective solenoid feed 51, 53 to control the expansion and deflection of the first annular inflatable member 38 and the second annular inflatable member 40 by changing the pressure therein. The solenoid 50 in module 12 is also preferably in fluid communication with the annular inflatable members in the other modules.

Figures 4A, 4B:
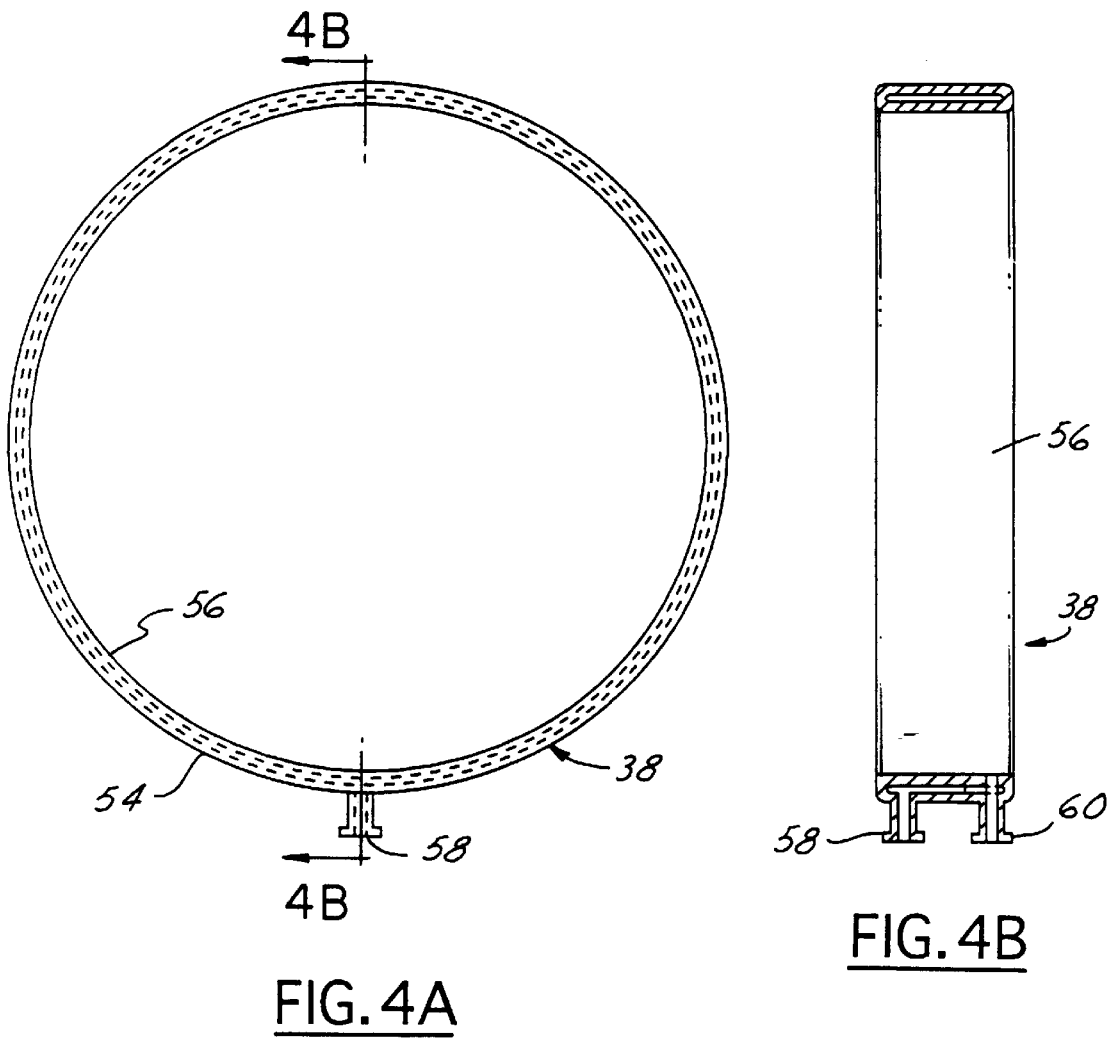
FIG. 4a is a front view of an annular inflatable member in accordance with a preferred embodiment of the present invention.
FIG. 4b is a sectional view of the annular inflatable member illustrated in FIG. 4a along the lines 4b—4b.

FIGS. 4a and 4b illustrate the preferred first annular inflatable member 38 in accordance with the present invention. The second annular inflatable member 40 has the same structure and characteristics and thus the description of the first annular inflatable member 38 applies to the second annular inflatable member 40 as well. It should be understood that various other bladder configurations may be utilized in accordance with the present invention. For example, membranes or diametrically constricting devices may alternatively be utilized in accordance with the present invention.

The first annular inflatable member 38 has an radially extending outer surface 54 and a radially extending inner surface 56. The radially extending outer surface 54 has a pair of inlet passageways 58, 60 extending therefrom. The inlet passageways are in fluid communication with the solenoid feeds 51, 53 and the solenoid 50 (FIG. 3) which controls the ingress and egress of fluid into the respective inflatable member. The fluid encapsulated within the annular inflatable members 38, 40 is preferably transmission fluid. However, any other fluid may be utilized.

As shown in FIG. 3, the inlet passageway 58 allows the solenoid 50 to increase the pressure in the first annular inflatable member 38 and thus inflate it. The second inlet passageway 60 allows the solenoid 50 to increase the pressure in the second annular inflatable member 40 and inflate it. Only one of the two inflatable members 38, 40 can be inflated at any given time.

The inlet passage 60 for the second annular inflatable member 40 has a seal 62 formed at its inner end. The seal 62 fills up with fluid and the fluid passes through a plurality of holes (not shown) formed in the first rotatable drum member 42. As the first rotatable drum member 42 rotates, the fluid makes its way from the seal 62 through the first rotational drum member 42 and into a seal 64 positioned in the holes (not shown) on the other side of the first rotatable drum member 42 and then into the second annular inflatable member 40. It is through this process that the pressure in the second annular inflatable member 40 is changed to effectuate expansion.

In operation, the desired gear is selected as determined by the ratio chart illustrated in FIG. 6. A signal representative of the gear selected is sent to the ECM 52. The ECM 52 determines what gear ratio is necessary to effectuate the desired gear selection and which module is needed to effectuate this gear ratio. A signal is then sent to the appropriate solenoid 50 to expand the appropriate bladder as required. When the first annular inflatable member 38 is inflated and expanded radially by the control system or ECM 52, the first annular inflatable member 38 will contact the first rotatable drum member 42 on its inner surface 56. Due to friction generated by the contact between the first annular inflatable member 38 and the first rotatable drum member 42, the rotation of the first rotatable drum member 42 will be inhibited. When the first inflatable member 38 is expanded radially and into contact with the first rotatable drum member 42 causing it to stop rotating, the output direction of the planetary gear set 34 reverses relative to the rotation of the input shaft 26.

When the second annular inflatable member 40 is inflated and expanded radially by the control system 52, the second annular inflatable member 40 is caused to contact the second rotatable drum member 48. As the second annular inflatable member 40 is applied, the first annular inflatable member 38 is released or deflated. The friction between the second annular inflatable member 40, which is attached to the rotating first rotatable drum member 42, will cause the second rotatable drum member 48 to rotate. The second rotatable drum member 48 is in rotational communication with the output shaft 30 and thus the rotation of the second rotatable drum member 48 will cause the output shaft 30 to rotate in the same direction as the input shaft 26. In this configuration, when the second annular inflatable member 40 locks the carrier assembly 42 with the ring gear 48, it is turning at a 1:1 ratio with the input shaft 26.

FIG. 5 illustrates an alternative embodiment of a forward/reverse module 70 in accordance with the present invention. The module 70 is preferably the first module in a multi-module drive speed control system 10. The module 70 is positioned within a housing 72 and has a planetary gear set 74, an outer annular bladder 76, and an inner annular bladder 78. The planetary gear set 74 includes a sun gear 80, a carrier assembly 82, a ring gear 84, an inner rotatable drum member 86, an outer rotatable drum member 88, and a secondary transfer drum 90.

When the module 70 is operating in the reverse mode, the outer annular bladder 76 is pressurized by the solenoid 92 into contact with the outer rotatable drum member 88. When the outer annular bladder 76 is inflated, it holds the outer rotatable drum 88 stationary. In the reverse mode, the input from the input shaft 94 is transferred through the sun gear 80 to the ring gear 84 and the rotation of the ring gear 84 is transferred through the secondary transfer drum 90 to an output shaft 96.

When the module is operating in the forward mode, the outer annular bladder 76 releases as the inner annular bladder 78 is pressurized by the solenoid 92, into contact with the inner rotatable drum member 86. The inner annular bladder 78 is attached to the secondary transfer drum 90 and when the inner annular bladder 78 is inflated into contact with the inner rotatable drum member 86, the sun gear 80 is placed in communication with the ring gear 84, which connects the input shaft 94 with the output shaft 96. This provides a 1:1 ratio between the input and output in the forward mode.

FIG. 6 illustrates an 8 speed mode chart for an automatic transmission in accordance with one embodiment of the present invention. It should be understood that any number of speeds, such as for example, 4, 5, 6, 7, and 8, may be employed. This is because the ECM 52 is programmable to handle any number of gears that a given transmission may have. This provides a drive speed control system with unlimited flexibility.

As shown in FIG. 6, for each gear selection in column 70, from 1 through 8, and reverse, there is a corresponding gear ratio listed in column 72. Column 74 includes the corresponding ratio spacing. The remaining columns indicate the bladders that are being inflated in order to accomplish the desired gear specified in column 70. For example, the "x" in column B1 and Row R indicates that the first annular inflatable member 38 of module 12 is inflated to drive the transmission in reverse. Column B1A refers to the second annular inflatable member 40 of module 12. The columns B2 and B2A are the first and second annular inflatable members 38, 40 of the second module 14. The columns B3 and B3A are the first and second annular inflatable members 38, 40 of the third module 16, the columns B4 and B4A are the first and second annular inflatable members 38, 40 of the fourth module 18, while the columns B5 and B5A are the first and second annular inflatable members 38, 40 of the fifth module 20.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A drive speed control system positioned within a housing comprising:

a planetary gear mechanism;

an input shaft in communication with said planetary gear mechanism;

an output shaft in communication with said planetary gear mechanism;

a first rotatable drum member in communication with said planetary gear mechanism;

a second rotatable drum member positioned radially inwardly relative to said first rotatable drum member and in communication with said planetary gear mechanism;

a first annular inflatable member positioned radially outwardly of said first drum member and fixed to the housing;

a second annular inflatable member fixed to said first rotatable drum member and positioned radially outward of said second rotatable drum member; and a control system in communication with said first and second annular inflatable members;

wherein said control system is adapted to cause said first annular inflatable member to be inflated and expand radially, thereby inhibiting rotation of said first rotatable drum member;

wherein said control system is also adapted to cause said second annular inflatable member to be inflated and expand radially as said first annular inflatable member is deflated, thereby causing said first rotatable drum member to rotate with said second rotatable drum member.

2. The drive speed control system of claim 1, wherein said first annular inflatable member is attached to said housing, wherein when said first annular inflatable member is inflated by said control system, said first annular inflatable member expands radially and contacts said first rotatable drum member.

3. The drive speed control system of claim 1, wherein said first annular inflatable member comprises a friction member positioned to come into contact with said first rotatable drum when said first annular inflatable member is inflated and expanded.

4. The drive speed control system of claim 1, wherein said second annular inflatable member is attached to said first rotatable drum member, wherein when said second annular inflatable member is inflated by said control system, said second annular inflatable member expands radially and contacts said second rotatable drum member.

5. The drive speed control of claim 4, wherein said second annular inflatable member comprises a friction member positioned to come into contact with said second rotatable drum member when said second annular inflatable member is inflated and expanded.

6. The drive speed control system of claim 1, wherein when said first annular inflatable member is inflated and contacts said first rotatable drum member, the control system causes said second annular inflatable member to deflate.

7. The drive speed control system of claim 1, wherein said drive speed control system is a reversible drive speed control system.

8. The drive speed control system of claim 1, wherein said first rotatable drum member is in communication with a carrier assembly which houses the pinion gear of said planetary gear mechanism.

9. The drive speed control system of claim 1, wherein said second rotatable drum member is in communication with said output shaft.

10. The drive speed control system of claim 1, wherein when said second annular inflatable member is expanded radially, it contacts said second rotatable drum member and causes it to rotate thereby in turn causing said output shaft to rotate in the same direction as said input shaft.

11. The drive speed control system of claim 1, wherein when said first annular inflatable member is expanded radially, it contacts said first rotatable drum member and causes it to stop rotating thereby in turn reversing the output directions of said planetary gear mechanism relative to the input direction.

12. The drive speed control system of claim 1, further comprising:

a secondary transfer drum member located between the second annular drum member and the second annular inflatable member to effectuate ratio transfer.

13. A method of changing the gear ratios in a vehicle control system, having a planetary gear assembly, an input shaft, and an output shaft, comprising:

providing a first rotatable drum member in communication with said planetary gear mechanism;

positioning a second rotatable drum member outward of said first rotatable drum member;

providing a first annular inflatable member that is secured within the vehicle and in located annularly outward of the second rotatable drum member;

providing a second annular inflatable member that is positioned annularly between the first rotatable drum member and the second rotatable drum member;

inflating the first annular inflatable member into contact with the second rotatable drum member to prevent the second rotatable drum member from rotating allowing the output shaft to be driven in the opposite direction from the input shaft; and deflating the first annular inflatable member while inflating the second annular inflatable member into contact with the first rotatable drum member to drive the first and second rotatable drum members at the same gear ratio.

14. The method of claim 13, further comprising:

providing a secondary transfer drum member located between the second annular drum member and the second annular inflatable member; and attaching the second annular drum member to said secondary transfer drum member to effectuate the connection of the input shaft to the output shaft.

* * * * *